US009396416B2

(12) United States Patent
Matsumoto et al.

(10) Patent No.: US 9,396,416 B2
(45) Date of Patent: Jul. 19, 2016

(54) CARD CONNECTOR

(71) Applicant: Molex, LLC, Lisle, IL (US)

(72) Inventors: Yasuyoshi Matsumoto, Yamato (JP); Masamitsu Takasaki, Yamato (JP); Manabu Yamanaka, Yamato (JP); Yuki Goto, Yamato (JP); Mitsuhiro Tomita, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/206,664

(22) Filed: Mar. 12, 2014

(65) Prior Publication Data

US 2014/0273564 A1    Sep. 18, 2014

(30) Foreign Application Priority Data

Mar. 12, 2013    (JP) .................................. 2013-048715

(51) Int. Cl.
*H01R 13/62* (2006.01)
*G06K 13/08* (2006.01)

(52) U.S. Cl.
CPC ........ *G06K 13/0856* (2013.01); *G06K 13/0812* (2013.01); *G06K 13/0831* (2013.01)

(58) Field of Classification Search
CPC .............................. G06K 13/08; H01R 13/633
USPC .................................................. 439/159, 160
See application file for complete search history.

(56) References Cited

U.S. PATENT DOCUMENTS

| | | | | |
|---|---|---|---|---|
| 5,984,702 | A * | 11/1999 | Nishioka ............ | G06K 13/0806 439/159 |
| 6,033,244 | A * | 3/2000 | Nishioka ................ | G06K 13/08 439/159 |
| 6,338,636 | B2 | 1/2002 | Nishioka | |
| 6,370,608 | B2 * | 4/2002 | Yamada et al. ................ | 710/301 |
| 6,503,092 | B1 * | 1/2003 | Sato ........................ | G06K 13/08 439/159 |
| 7,244,130 | B2 | 7/2007 | Miyamoto | |
| 7,811,106 | B2 * | 10/2010 | Lin .......................... | G06K 13/08 439/159 |
| 8,167,643 | B2 | 5/2012 | Yoshida et al. | |
| 8,337,223 | B2 * | 12/2012 | Gao ................... | G06K 13/0856 439/159 |
| 8,961,207 | B2 * | 2/2015 | Lim ..................... | G06K 7/0021 439/159 |

(Continued)

FOREIGN PATENT DOCUMENTS

| | | | |
|---|---|---|---|
| JP | 2002-313485 A | 10/2002 | |
| JP | 2005-302431 A | 10/2005 | |

(Continued)

*Primary Examiner* — Abdullah Riyami
*Assistant Examiner* — Thang Nguyen
(74) *Attorney, Agent, or Firm* — James A. O'Malley (57) ABSTRACT

A card connector has an inserted card module including electrode pads provided on one surface. The card connector includes a housing provided with connection terminals arranged so as to contact the electrode pads of the card module. The card connector includes a holding spring portion for holding a card module inserted into the card connector. The card connector includes an ejection mechanism able to change orientation between a first orientation and a second orientation. The ejection mechanism has the first orientation before a card module is inserted into the card connector, and the second orientation after a card module has been completely inserted into the card connector. The holding spring portion is displaceable when the ejection mechanism is in the first orientation, and non-displaceable when the ejection mechanism is in the second orientation.

19 Claims, 8 Drawing Sheets

(56) References Cited

U.S. PATENT DOCUMENTS

| | | |
|---|---|---|
| 2002/0008142 A1 | 1/2002 | Takayasu et al. |
| 2002/0048979 A1* | 4/2002 | Kodama ............. G06K 13/0806 439/159 |
| 2003/0114031 A1* | 6/2003 | Hu ........................ G06K 13/08 439/159 |
| 2004/0235325 A1* | 11/2004 | Iijima .................. G06K 7/0013 439/159 |
| 2009/0221168 A1* | 9/2009 | Yu ........................ G06K 7/0021 439/159 |
| 2009/0221174 A1* | 9/2009 | Matsumoto .......... G06K 7/0021 439/374 |
| 2014/0273564 A1 | 9/2014 | Matsumoto et al. |

FOREIGN PATENT DOCUMENTS

| | | |
|---|---|---|
| JP | 2009-181787 A | 8/2009 |
| JP | 2012-146485 A | 8/2012 |
| JP | 2012-146489 A | 8/2012 |
| TW | M412532 U | 9/2011 |

\* cited by examiner

CARD CONNECTOR

CROSS REFERENCE TO RELATED APPLICATIONS

The Present Disclosure claims priority to prior-filed Japanese Patent Application No. 2013-048715, entitled "Card Connector," filed on 12 Mar. 2013 with the Japanese Patent Office. The content of the aforementioned patent application is fully incorporated in its entirety herein.

BACKGROUND OF THE PRESENT DISCLOSURE

The Present Disclosure relates, generally, to a card connector, and, more particularly, to a card connector which enables the holding spring portion for holding the card module to be displaced when the card connector houses a card module, thereby increasing the holding force used to hold the card module inside the card connector, and more securely holding the card module.

Electronic devices typically include card connectors to allow various types of memory cards to be used. An example is disclosed in Japanese Patent Application No. 2011-003678, the content of which is hereby incorporated herein in its entirety.

Figure 8:
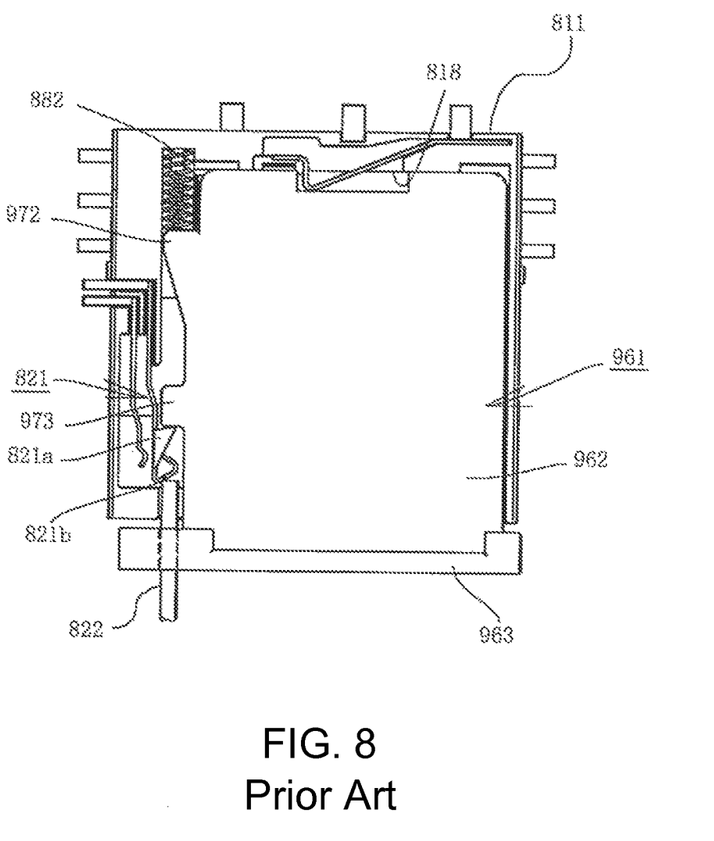
FIG. 8 is a diagram showing a conventional card connector.

FIG. 8 is a diagram showing a conventional card connector. In FIG. 8, 811 is the housing for a card connector made of an insulating resin material. This includes an accommodating portion 818 for accommodating a card tray 961 in which a card (not shown) has been loaded. The card can be, for example, a SIM card, which has electrode pads (not shown) on its bottom surface. These electrode pads are exposed on the bottom surface of the card tray 961. A plurality of terminals (not shown) are arranged on the bottom plate portion of the accommodating portion 818 to match the arrangement of the electrodes on the card. A cover member (not shown) is attached to cover the housing 811. A card tray 961 is inserted into the space formed between the bottom plate portion of the accommodating portion 818 and the cover.

The interior of the housing 811 includes a compression spring member 882 for applying a biasing force in the direction discharging the inserted card tray 961, and a lock member 821 for locking and holding the inserted card tray 961 inside the housing 811. The lock member 821 is a cantilevered plate spring made from a metal plate, and an engaging protruding portion 821a and an operating protruding portion 821b are formed in the tip. The card tray 961 includes a rear plate portion 963, a top plate portion 962 extending forward from the rear plate portion 963 and covering the upper surface of the card, a spring receiving portion 972 protruding from the side end of the top plate portion 962, and an engaging protrusion 973. As shown in FIG. 8, when the card tray 961 is inserted into the housing 811, the front end of the spring receiving portion 972 comes into contact with the rear end of the compression spring member 882 and receives the biasing force of the compression spring member 882.

When the engaging protrusion 973 engages the lock member 821, the card tray 961 is held inside the housing 811 against the biasing force of the compression spring member 882. When the card tray 961 is removed from the housing 811, the rod-shaped ejection operation member 822 is operable, and the operating protruding portion 821b of the lock member 821 is displayed outward in the width direction at the tip of the ejection operation member 822. Because the engaging protrusion 973 of the card tray 961 and the engaging protruding portion 821a of the lock member 821 are disengaged in this way, the biasing force of the compression spring member 882 discharges the card tray 961 from the housing 811.

However, in the card connector of FIG. 8, the engaging protruding portion 821a of the lock member 821 and the engaging protrusion 973 of the card tray 961 remain engaged and the card tray 961 is held inside the housing 811 because of the spring action of the lock member 821, which is a cantilevered plate spring. If the card connector is subjected to external forces such as vibrations or a shock when the electronic device in which the card connector is dropped, the external force may cause the engaging protruding portion 821a of the lock member 821 to become displaced to the outside in the width direction, and to disengage from the engaging protrusion 973 of the card tray 961. Further, if a force is improperly applied to the rear plate portion 963 of the card tray 961 in the direction of discharge for the card tray 961—that is, the card tray 961 is improperly pulled out instead of performing the proper ejection operation on the card tray 961, the engaging protrusion 973 of the card tray 961 may simply become disengaged.

SUMMARY OF THE PRESENT DISCLOSURE

It is an object of the Present Disclosure to provide a more reliable card connector which enables the holding spring portion for holding the card module to be displaced when the card connector houses a card module, thereby increasing the holding force used to hold the card module inside the card connector, and more securely holding the card module.

The Present Disclosure is a card connector having an inserted card module including electrode pads provided on one surface. The card connector includes a housing provided with connection terminals arranged so as to contact the electrode pads of the card module; a holding spring portion for holding a card module inserted into the card connector; and an ejection mechanism able to change orientation between a first orientation and a second orientation. The ejection mechanism has the first orientation before a card module is inserted into the card connector, and the second orientation after a card module has been completely inserted into the card connector. The holding spring portion being displaceable when the ejection mechanism is in the first orientation, and non-displaceable when in the second orientation.

In another card connector of the Present Disclosure, the holding spring portion includes a holding protruding portion bulging inward in the width direction of the housing. The card module includes a holding recessed portion formed in an outer side surface thereof. The holding spring portion holds the card module when the holding protruding portion engages the holding recessed portion. In another card connector of the Present Disclosure, the ejection mechanism includes a rod member able to slide in the insertion and discharge directions of the card module, and a pivotable lever member linked to the lever member. The lever member includes a force output portion abutting the card module, a fulcrum portion, and a force input portion positioned on the opposite side to the force output portion, the fulcrum being interposed between the force output portion and the force input portion. The rod member includes an engaging portion for engaging the force output portion, an operating portion protruding from the housing, and a stopper portion able to interfere with the holding spring portion. In another card connector of the Present Disclosure, the holding spring portion includes a notched portion unable to abut the stopper portion, and a stopper abutting portion formed adjacent to the notch portion and able to abut the stopper portion. The stopper portion is positioned corresponding to the notched portion in relation to the insertion and discharge directions of the card module when the ejection mechanism is in the first orientation, and is positioned corresponding to the stopper abutting portion in relation to the insertion and discharge directions of the card module when the ejection mechanism is in the second orientation.

In another card connector of the Present Disclosure, the lever member includes an engaging portion for engaging the lever member when the ejection mechanism is in the first orientation and in the second orientation. In another card connector of the Present Disclosure, the card connector also includes a cover member mounted on the housing and covering at least the housing and a portion of the card module inserted into the card connector, and the cover member includes an opposing engaging portion for engaging the engaging portion. In another card connector of the Present Disclosure, the cover member includes a second holding spring portion formed on the side opposite the holding spring portion.

In the card connector of the Present Disclosure, the holding spring portion for holding the card module can be displaced when the card connector houses a card module. As a result, the holding force used to hold the card module inside the card connector can be increased, and the card module can be held more securely. This can increase overall reliability.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 1 is a perspective view of the card module in a first embodiment of the Present Disclosure, in which (a) shows the card tray when it is not holding a card, and (b) shows the card tray when it is holding a card;

FIG. 2 is a perspective view of the card module of FIG. 1, in which (a) shows the card tray when it is not holding a card, and (b) shows the card tray when it is holding a card;

FIG. 3 is a perspective view of the card connector of FIG. 1, in which (a) shows the card connector with the shell attached, and (b) shows the card connector with the shell removed;

FIG. 4 is a perspective view from a first vantage point used to explain the operation performed to insert a card module into the card connector of FIG. 1, in which (a) and (b) show the steps performed in this operation;

FIG. 5 is a perspective view from a second vantage point used to explain the operation performed to insert a card module into the card connector of FIG. 1, in which (a) and (b) show the steps performed in this operation;

FIG. 6 is a perspective view from a second vantage point used to explain the operation performed to insert a card module into the card connector of FIG. 1, in which (a) and (b) show the steps performed in this operation;

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1A:
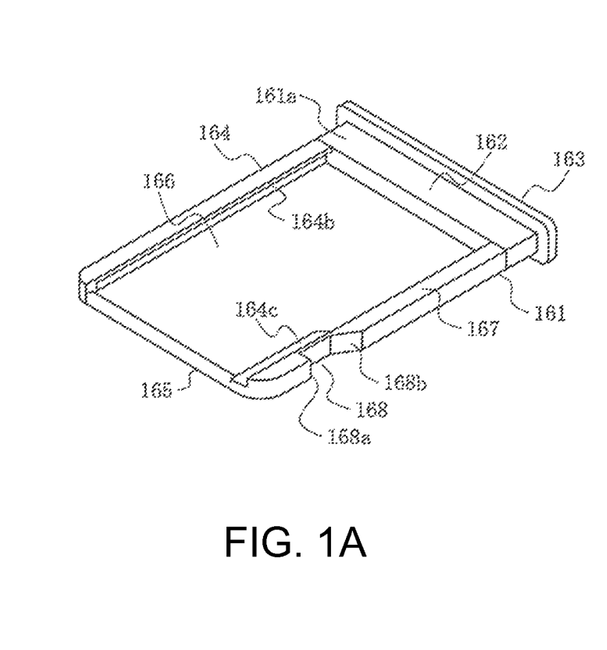
Figure 1B:
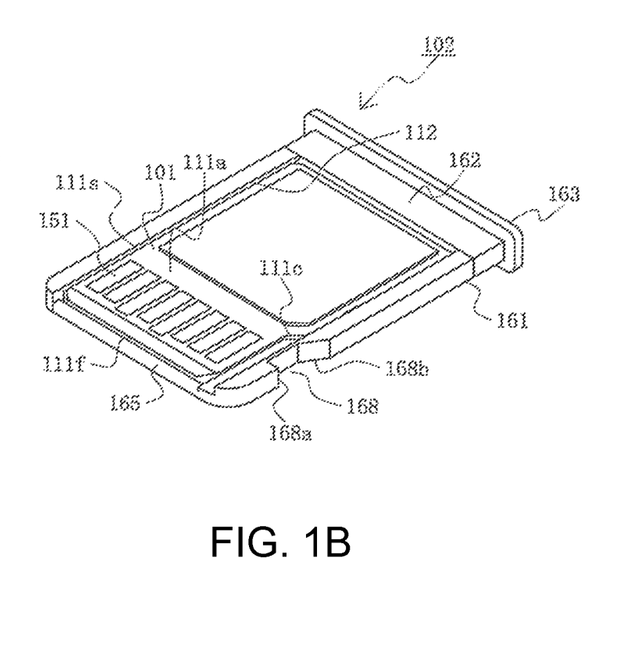
Figure 2A:
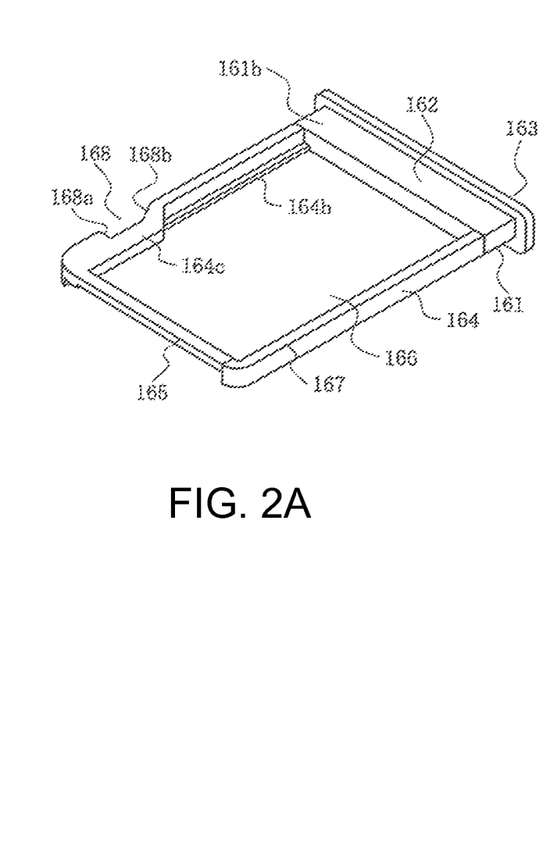
Figure 2B:
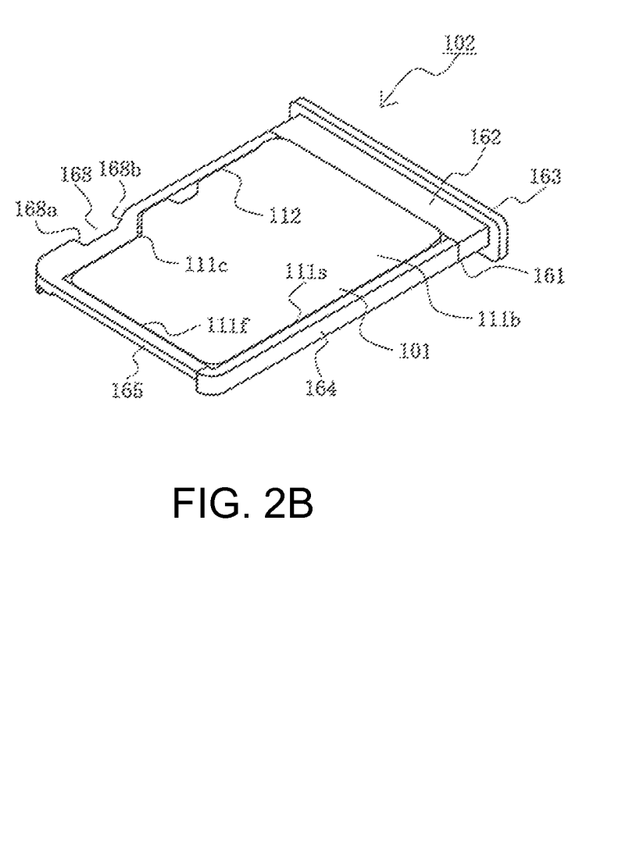

Referring to the drawings, 102 is the card module in the present embodiment, which is inserted into a card connector 1 described below mounted in an electronic device (not shown). The card module 102 is mounted in the electronic device via the card connector 1. The electronic device can be any device. The card module 102 can be any type of memory card. It may also be a card adapter having a shape and dimensions suitable for insertion into the card connector 1 in order to house a memory card. In addition, it may be a card tray having a shape and dimensions suitable for insertion into the card connector 1 in order to house a memory card. In summary, the card module may be any module that can be inserted into the card connector 1 and that can establish an electrical connection with an electronic device via the card connector 1. For the sake of convenience, the card module 102 in the explanation of the present embodiment is a card tray 161 housing and holding a card 101 as shown in FIGS. 1-2.

As illustrated, the card 101 has a substantially rectangular plate-like shape, and contact pads 151 serving as the electrode pads or terminal members are arranged in rows along the front end 111f on one surface (the bottom surface 111a in the example illustrated). In other words, the contact pads 151 are not provided on the other surface, or the top surface 111b on the side opposite the bottom surface 111a. A notched portion 111c, which is notched on an inclined angle, is formed on either the right or the left side of the front end 111f connected to the side edge 111s, more specifically, in the rear right corner of the bottom surface 111a. The notched portion 111c is cut in the angle portion formed by the front end 111f and one side end 111s of the card 101 within a predetermined range to form a trapezoid.

Here, the card tray 161 is an integrally formed member obtained by punching and bending a conductive metal plate, and includes a substantially rectangular shaped frame member 167 surrounding the four corners of a space portion 166 serving as the card housing space for housing the card 101. The frame member 167 includes a rear frame portion 162 and a front frame portion 165 which extend parallel to each other in the width direction, and a pair of left and right side frame portions 164 extending in the length direction and connected to both ends of the rear frame portion 162 and both ends of the front frame portion 165. A rear plate portion 163 is integrally formed in the rear surface of the rear frame portion 162.

The space portion 166 is a substantially rectangular space through which the card tray 161 passes from the top surface 161b to the bottom surface 161a. The four corners of this space are demarcated by the rear frame portion 162, the front frame portion 165, and the side frame portions 164. The side surfaces 112 of a card 101 housed inside the space portion 166 (the sides extending perpendicular to the bottom surface 111a and the top surface 111b and connected to the bottom surface 111a and the top surface 111b) are surrounded by the frame member 167 with the rear frame portion 162, the front frame portion 165, and the side frame portions 164 facing the inside surfaces.

A protruding portion 164c is formed in a corner of the front frame portion 165 connected to the side frame portion 164, more specifically, the right front corner. The protruding portion 164c functions as a card orientation restricting portion. As shown, it allows a card 101 to be accommodated inside the card tray 161 when the card 101 is oriented properly, but does not allow the card 101 to be accommodated inside the card tray 161 when the card 101 is oriented improperly. More specifically, the protruding portion 164c has a trapezoidal shape which is formed to mate with the notched portion 111c of a card 101 properly inserted into the space portion 166. Therefore, the card 101 cannot be inserted into and accommodated inside the space portion 166 of the card tray 161 when oriented improperly, such as when the card is upside down or inserted with the rear end of the card facing forward.

Overhanging sections 164b opposing each other extend from the side edges of the bottom surface 161a of the card tray 161 on the inner surfaces of the pair of side frame portions 164. The pair of left and right overhanging sections 164b extends in the length direction and function as a card supporting unit that supports the card 101 housed inside the space portion 166 near the left and right side edges of the bottom surface 111a. The overhanging portions 164b are not formed where the protruding portion 164c is formed. The amount by which the overhanging sections 164b protrude from the inner surfaces of the side frame portions 164 is slight so that they do not interfere with the contact pads 151 arranged on the bottom surface 111a of the card 101. In other words, the space portion 166 is large enough not to interfere at least with the contact pads 151 on the bottom surface 161a of the card tray 161.

The dimensions of the rear plate portion 163 in the thickness direction and the width direction of the card tray 161 are greater than those of the rear frame portion 162, the front frame portion 165, and the side frame portions 164. In this way, the rear plate portion 163 prevents improper insertion into the connector 1 when the card tray 161 is oriented backwards in the length direction.

The dimension of the frame member 167 in the thickness direction of the card tray 161 is equal to that of the rear frame portion 162 and the side frame portions 164, and the front frame portion 165 is smaller than the rear frame portion 162 and the side frame portions 164. However, this is formed to be flush with the top surface 161b of the card tray 161. Preferably, the top surface 161b of the card tray 161 is substantially flush with the top surface 111b of the card 101 housed inside the space portion 166.

The surfaces of the rear frame portion 162 and the side frame portions 164 preferably protrude downward from the bottom surface 111a of the card 101 housed inside the space portion 166. As shown in FIG. 1(b), when viewed from the front, the side frame portions 164 constitute protruding portions which protrude towards the bottom surface 161a at both ends of the front frame portion 165. In other words, the card tray 161 has a downward-facing bracket shape when viewed from the front. The protruding portions prevent improper insertion when the card tray 161 is inserted into the card connector 1 upside down.

The surface of the front frame portion 165 on the bottom surface 161a side is lower than the bottom surface 111a of the card 101 housed inside the space portion 166. In other words, it is preferably positioned closer to the top surface 161b. In this way, contact between the front frame portion 165 and the terminals 51 described below can be prevented when the card tray 161 is inserted into the card connector 1.

In the present embodiment, a holding recessed portion 168 is formed in at least one side frame portion 164 near the front end on the outer surface (the side frame portion 164 in which the protruding portion 164c has been formed in the example shown). In other words, it is formed near the front frame portion 165 to hold the card tray 161 inside the card connector 1. The holding recessed portion 168 includes a forward inclined surface with a sharp angle of inclination relative to the outer surface of the side frame portion 164 and a rearward inclined surface 168b with a gradual angle of inclination relative to the same surface. A holding recessed portion 168 can be formed in both the left and right side frame portions 164.

In the card tray 161 of the present embodiment, the card 101 is housed inside the space portion 166 passing between the top surface 161b and the bottom surface 161a, and surrounding the side surfaces 112 of the card 101. This structure does not cover either the bottom surface 111a or the top surface 111b. As a result, the dimensions can be reduced in the thickness direction. This allows the profile of the card connector 1 to be reduced. Because this is made of metal, sufficient strength can be maintained even when the dimensions are reduced in the length direction and the width direction. This allows the size of the card connector 1 to be reduced.

When used with the card module 102 in the present embodiment in the present embodiment, the card connector 1 has a housing 11 integrally molded from an insulating material, and a shell 61 serving as the cover member mounted on top of the housing 11 which is integrally formed by punching and bending a conductive metal plate. The shell 61 covers at least the housing 11 and the portion of the card tray 161 in which the card connector 1 has been inserted. The card connector 1 has a relatively flat rectangular solid shape, is mounted in an electronic device, and is configured so a card tray 161 is inserted into or ejected from the housing 11 via a rear insertion slot 18 (from the bottom right in FIG. 3(a)). More specifically, the card tray 161 is inserted into the space formed between the housing 11 and the shell 61.

Figure 3A:
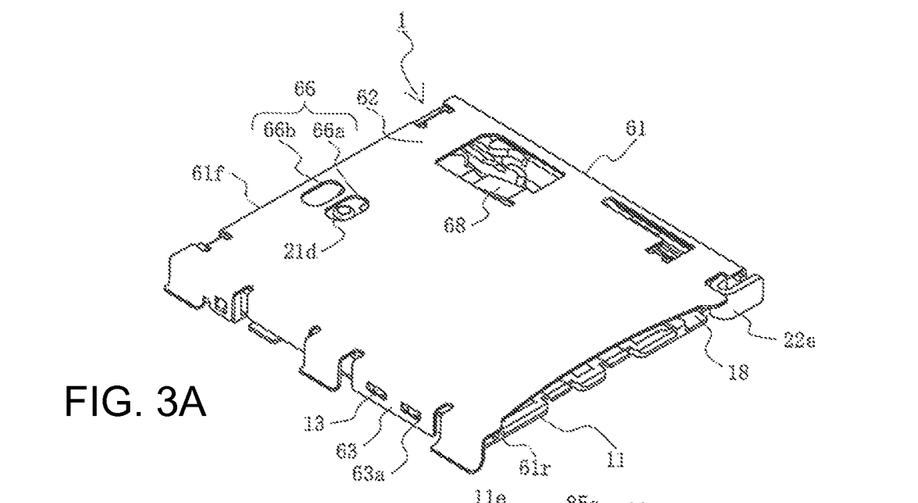

In the present embodiment, the front end of the card connector 1 in the insertion direction of the card tray 161 (upward and to the right in FIG. 3(a)) is referred to as the front end portion, and the rear end in the insertion direction (downward and to the right in FIG. 3(a)) is referred to as the rear end portion. As shown, the housing 11 has a bottom wall portion 11b which is a substantially rectangular plate member, and an inner wall portion 11a extending along the front end portion 11f, or the front end of the housing 11 in the insertion direction of the card tray 161, and standing erect from the bottom wall portion 11b. The rear end portion of the housing 11 in the insertion direction of the card tray 161 is referred to as the rear end portion 11r.

A plurality of terminals 51 are mounted on the bottom wall portion 11b and are arranged in rows in the width direction of the housing 11. At least the base portion 51a of the terminals 51 are embedded in the bottom wall portion 11b. More specifically, the terminals 51 have been set in the cavity of the mold and filled with an insulating material so that at least the base portions 51a are covered with the insulating material constituting the bottom wall portion 11b and are secured in the bottom wall portion 11b.

Each terminal 51 has a cantilevered contact arm portion 51b connected to the base end of the base portion 51a and extending towards the front end portion 11f, a contact portion 51c connected to the tip or free end of the contact arm portion 51b, and a solder tail portion 51d or substrate connecting portion which is connected to the base end of the base portion 51a and extends towards the rear end portion 11r. At least the top surface of the contact portion 51c is positioned above the top surface of the bottom wall portion 11b when a card 101 housed in a card tray 161 is not inserted into the card insertion space.

Here, the bottom wall portion 11b includes a contact arm opening 11c formed to correspond to the contact arm portion 51b and contact portion 51c of a terminal 51. The contact arm opening 11c is an opening passing through the bottom wall portion 11b in the thickness direction, and the contact arm portion 51b and the contact portion 51c of all of the terminals 51 are positioned inside a contact arm opening 11c when viewed from above.

Also, solder tail openings 11d are formed in the bottom wall portion 11b which pass through the bottom wall portion 11b in the thickness direction. The solder tail portions 51d are exposed in the solder tail openings 11d as the base connecting portion of each terminal 51. Each solder tail portion 51d is connected to the base portion 51a of each terminal 51 via a connection portion (not shown) embedded in the bottom wall portion 11b. Each solder tail portion 51d is then connected electrically via solder to a terminal member such as a signal line, contact pad or terminal formed on the circuit board of the electronic device.

Each terminal 51 is arranged so that the contact portion 51c makes contact with a contact pad 151 on the card 101 in the card tray 161 held inside the card connector 1. Therefore, the number and arrangement of the terminals 51 should conform to the number and arrangement of contact pads 151 on the card 101.

The housing 11 has a pair of side wall portions 11e extending in the length direction along the side edges, and a tray ejecting rod housing portion 11g is formed inside one of the side wall portions 11e. A push rod 22 serving as the ejection operation member in the ejection mechanism for ejecting the card tray 161 inserted in the card connector 1 is slidably mounted in the tray ejecting rod housing portion 11g. The ejection mechanism can be changed in orientation between a first orientation and a second orientation. The first orientation occurs before a card tray 161 is inserted into the card connector 1, and the second orientation occurs after a card tray 161 has been inserted into the card connector 1. The push rod 22 can slide in the longitudinal direction along one of the side wall portions 11e.

The push rod 22 is a substantially linear rod-shaped or band-shaped member, but a bend operating portion 22a is connected integrally to the rear end portion protruding from the housing 11. The operating portion 22a has a shape which makes it easier to operate when the user of the card connector 1 operates the operating portion using fingers or a tool such as a pin or rod. An engaging portion 22b for engaging the force input portion 21b of the ejection lever 21 serving as the lever member in the ejection mechanism is formed in the front end portion of the push rod 22. A stopper portion 22c protruding inward in the width direction of the housing 11 is formed in a section of the push rod 22 closer to the rear end portion than the engaging portion 22b.

The ejection lever 21 is a lever member arranged near the inner wall portion 11a to be able to swing, and functions as the tray ejecting lever in the ejection mechanism. Therefore, fulcrum portion 21c of the ejection lever 21 is mounted rotatably on the bottom wall portion 11b. The end portion of the ejection lever 21 on the other side of the fulcrum portion 21c relative to the force input portion 21b abuts the card tray 161 inserted into the card connector 1 and functions as a force output portion 21a applying force to the card tray 161 in the direction of ejection. An engaging protrusion 21d protruding upward is formed near the force output portion 21a on the top surface of the ejection lever 21 to serve as an engaging portion for engaging the ejection lever 21 when the ejection mechanism is in the first and second orientations.

The tray-ejecting rod housing portion 11g houses a first holding member 85 at a position near the push rod 22 and to the inside of the push rod 22 in the width direction of the housing 11. The first holding member 85 serves as a holding spring portion for holding the card tray 161 inserted inside the card connector 1. It is displaceable when the ejection mechanism is in the first orientation, but not displaceable when the ejection mechanism is in the second orientation.

More specifically, the first holding member 85 includes a base portion 85a which is a band shaped member made of metal with spring action and is secured near the rear end portion 11r of the housing 11 by a securing member 11k, a cantilevered main body portion 85b whose base end is connected to the base portion 85a and which extends towards the front end portion 11f, a holding protruding portion 85c whose base end is connected to the tip of the main body portion 85b and which protrudes inward in the width direction of the housing 11, and a free end portion 85d whose base end is connected to the tip of the holding protruding portion 85c and which extends towards the front end portion 11f.

When viewed from above, the main body portion 85b and the free end portion 85d extend substantially parallel to each other, and the holding protruding portion 85c has a mound shape whose bulge protrudes inward from the main body portion 85b and the free end portion 85d in the width direction of the housing 11. The holding protruding portion 85c is inserted into and engages the holding recessed portion 168 in the card tray 161 inserted into the card connector 1. The holding protruding portion 85c includes a forward inclined portion 85c1 having a sharp angle of inclination relative to the direction of extension for the main body portion 85b and the free end portion 85d, and a rearward inclined portion 85c2 having a gradual angle of inclination relative to the same direction.

When viewed from the side, the top surface of the main body portion 85b, the top surface of the holding protruding portion 85c and the top surface of the section of the free end portion 85d near the holding protruding portion 85c (referred to below as the stopper abutting portion 85e) are substantially parallel to and flush with the top surface of the bottom wall portion 11b. The top surface of the free end portion 85d closer to the front end portion 11f than the stopper abutting portion 85e is lower than the top surface of the other portions and includes a notched portion 85f. The position of the top surface of the notched portion 85f is lower than the position of the bottom surface of the stopper portion 22c of the push rod 22. The position of the top surface of the stopper abutting portion 85e is at least higher than the position of the bottom surface of the stopper portion 22c, and preferably higher than the position of the top surface of the stopper portion 22c. In other words, the stopper abutting portion 85e is able to make contact with the stopper portion 22c, and the notched portion 85f is unable to make contact with the stopper portion 22c.

Therefore, when the stopper portion 22c of the slidable push rod 22 is in a position corresponding to the notched portion 85f with respect to the longitudinal direction, the holding protruding portion 85c is displaced outward in the width direction of the housing 11 without interfering with the free end portion 85d and the stopper portion 22c. However, when the stopper portion 22c is in a position corresponding to the stopper abutting portion 85e with respect to the longitudinal direction, the stopper abutting portion 85e comes into contact with the stopper portion 22c, and the holding protruding portion 85c along with the free end portion 85d cannot be displaced outward in the width direction of the housing 11.

The card connector 1 also has a detection switch for detecting a card tray 161 that has been inserted into the card connector 1. More specifically, the terminals of the tray detecting switch serving as the detection switch are arranged near the front end portion 11f of the housing 11 to detect when the card tray 161 has been inserted at a predetermined position in the card connector 1 (the position where each contact pad 151 makes reliable contact with the contact portion 51c of each corresponding terminal 51 when the card tray 161 is held by the first holding member 85 and a card 101 is housed in the card tray 161). The tray detecting switch includes a first contact member 57 or cantilevered terminal mounted at or near the front end portion 11f and a second contact member 58 or terminal held by the bottom wall portion 11b.

The first contact member 57 is a cantilevered spring member mounted in the front end portion 11f whose tip or free end extends widthwise and to the rear from the front end portion 11f. The second contact member 58 is a flat, plate-like member which is mostly embedded in the bottom wall portion 11b but which has an exposed portion.

When the card tray 161 has not been inserted, as shown, the first contact member 57 does not make contact with the second contact member 58. In other words, the terminals do not make contact with each other, and the tray detecting switch does not conduct electricity and is turned OFF. However, when the card tray 161 is inserted into the card connector 1 and has reached a predetermined position, the free end of the first contact member 57 is displaced in the direction of the front end portion 11f by the front frame portion 165 of the card tray 161, and the front terminal member 57 makes contact with the second contact member 58. In other words, the terminals make contact with each other, and the tray detecting switch conducts electricity and is turned ON. In this way, it detects that the card tray 161 has reached a predetermined position.

The shell 61 has a substantially rectangular top plate portion 62, and side plate portions 63 standing erect from the side edge of the top plate portion 62. A plurality of latching openings 63a are formed in the side plate portions 63. When the shell 61 is mounted on the housing 11, latching protrusions 13 formed in the outer surface of the side wall portion 11e of the housing 11 become latched in the latching openings 63a, and this secures the shell 61 to the housing 11. The front end and rear end of the shell 61 in the insertion direction of the card tray 161 are referred to as the front end portion 61f and the rear end portion 61r.

The top plate portion 62 includes a plate-like pressure-applying member 68 formed by bending a portion of the top plate portion 62 to apply pressure to the bottom wall portion 11b of the housing 11 and to have spring action. The pressure-applying member 68 pushes the card tray 161 inserted into the card connector 1 or the card 101 housed in the card tray 161 towards the bottom wall portion 11b.

Engaging holes 66 are formed in the top plate portion 62 as opposing engaging members for engaging the ejection lever 21 and the push rod 22 in a predetermined orientation or position. The engaging holes 66 include a first engaging hole 66a and a second engaging hole 66b. The engaging protrusion 21d on the ejection lever 21 engages either the first engaging hole 66a or the second engaging hole 66b to stop the ejection lever 21 and the push rod 22 in one of two orientations or positions.

Also, the housing 11 has flange portions 11h extending to the outside in the width direction from both the left and right sides of the bottom wall portion 11b. The flange portions 11h are plate members that are thinner than the bottom wall portion 11b and are formed so the bottom surface of the flange portions is substantially flush with the bottom surface of the bottom wall portion 11b. Therefore, the top surface of the flange portions 11h is positioned below the top surface of the bottom wall portion 11b. As a result, the shape of the insertion slot 18 formed between the rear end portion 11r of the housing 11 and the rear end portion 61r of the shell 61 not only has a slender rectangular shape whose thickness is uniform in the entire width direction, but also has a substantially downward-facing bracket shape with protruding portions protruding downward at both ends. When viewed from the front, as mentioned earlier, the front frame portion 165 of the card tray 161 is substantially crown-shaped with protruding portions at both ends. As a result, the insertion slot 18 works with the front frame portion 165 to prevent improper insertion of the card tray 161 into the card connector 1 upside down.

In addition, the dimension of the insertion slot 18 in the thickness direction is smaller than the dimension of the rear plate portion 163 of the card tray 161 in the thickness direction. Also, the dimension of the insertion slot 18 in the width direction is smaller than the dimension of the rear plate portion 163 of the card tray 161 in the width direction. Therefore, the insertion slot 18 works with the rear plate portion 163 to prevent improper insertion of a card tray 161 into the card connector 1 backwards.

The following is an explanation of the operations of a card connector 1.

First, the operation performed when the card module 102 is inserted will be explained.

First, the user uses a finger to insert a card tray 161 containing a card 101 serving as the card module 102 from the insertion slot 18 at the rear of the card connector 1 into the card insertion space formed between the housing 11 and the shell 61. For the sake of convenience, the shell 61 has been removed in FIGS. 5-6.

When properly inserted, the top surface 161b of the card tray 161 is facing upwards opposite the top plate portion 62 of the shell 61, and the front frame portion 165 is facing the front end portion of the card connector 1. When a card 101 is housed inside the card tray 161, the bottom surface 111a in which the contact pads 151 are arranged is facing downward opposite the bottom wall portion 11b of the housing 11 in which the terminals 51 are arranged, and the front end portion is facing the front end portion 1F of the card connector 1.

When the card tray 161 is inserted from the insertion slot 18 into the card insertion space formed between the housing 11 and the shell 61, the side frame portions 164 protrude downward from the bottom surfaces of the front frame portion 165 and the rear frame portion 162 and from the bottom surface 111a of the card 101 housed inside the space portion 166, and are guided by recessed portions formed on the left and right sides of the bottom wall portion 11b in the housing 11 into the card insertion space. In other words, the card tray 161 advances into the card insertion space with the bottom surface of the side frame portions 164 protruding downward facing the top surface of the flange portions 11h on the left and right sides positioned below the top surface of the bottom wall portion 11b.

Figure 5A:
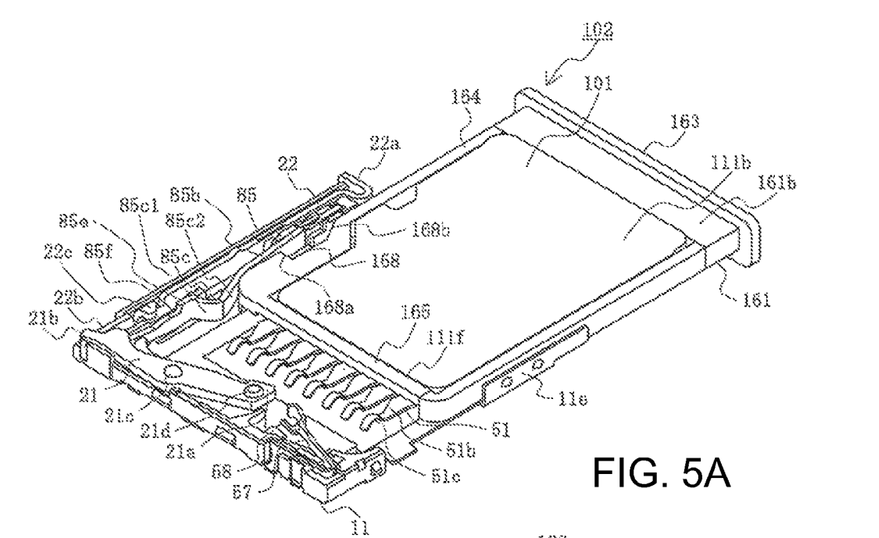

Next, as shown in FIG. 5(a), the holding protruding portion 85c of the first holding ember 85 comes into contact with the card tray 161. More specifically, the section where side frame portion 164 connects to the front frame portion 165 at the front end of the side frame portion 164 comes into contact with the rearward inclined surface 85c2 of the holding protruding portion 85c of the first holding member 85. In other words, in the initial state, before the card tray 161 has been inserted, the holding protruding portion 85c of the first holding member 85 protrudes significantly inward in the width direction inside the card insertion space. Therefore, the holding protruding portion 85c makes reliable contact with the card tray 161 inserted into the card insertion space.

Figure 5B:
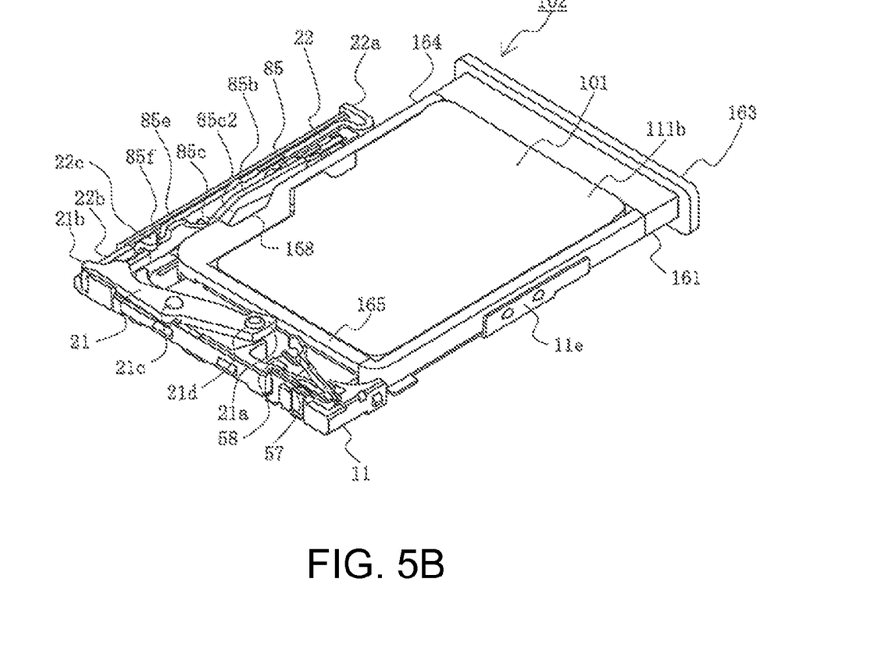

When the user pushes the card tray 161 in even further, as shown in FIG. 5(b), the holding protruding portion 85c of the first holding member 85 is pushed by the side surface of the side frame portions 164 of the card tray 161 and becomes displaced to the outside in the width direction, and moves towards the rear of the card tray 161 along the side surfaces of the side frame portion 164. At this time, the stopper portion 22c of the push rod 22 is positioned corresponding to the notch portion 85f in the longitudinal direction. Accordingly, the holding protruding portion 85c can be displaced outward in the width direction of the housing 11 along with the free end portion 85d without interfering with the stopper portion 22c. At this time, the force exerted by the user's fingers is transmitted from the card tray 161 to the first holding member 85, and the main body portion 85b of the first holding member 85 is elastically displaced. As a result, the card tray 161 receives frictional resistance due to the spring action of the first holding member 85. However, the frictional resistance is less than the force exerted by the user's fingers, and movement continues despite the frictional resistance.

Because the bottom surface of the front frame portion 165 is positioned closer to the top surface 161b than to the bottom surface 111a of the card 101 housed inside the space portion 166, the contact portions 51c of the terminals 51 contact the contact pads 151 arranged on the bottom surface 111a of the card 101 without contacting the front frame portion 165 when the card tray 161 is inserted into the card insertion space.

Figure 3B:
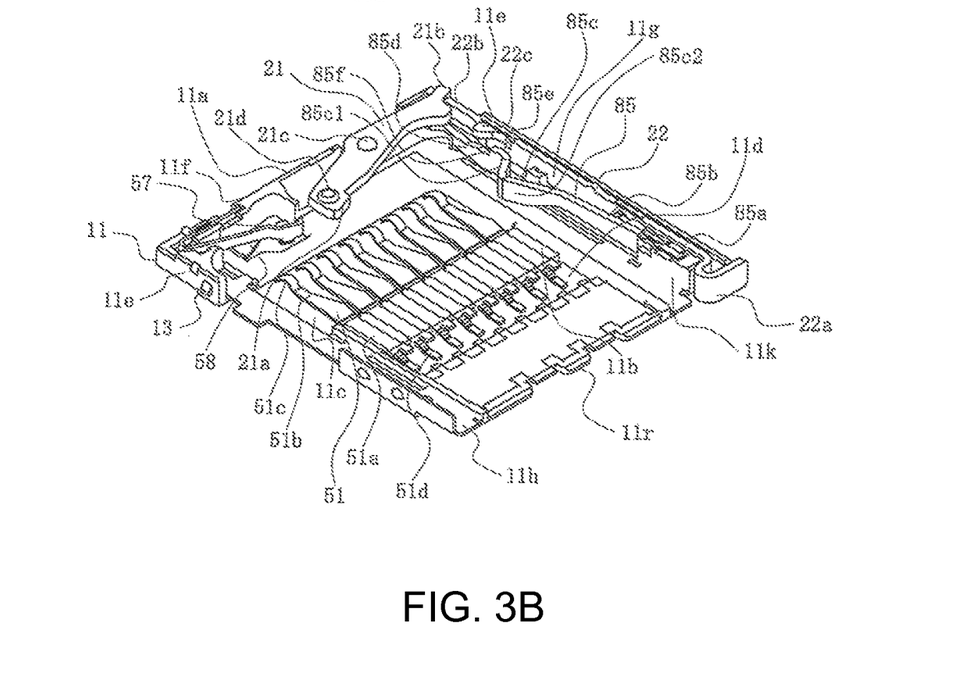
Figure 4A:
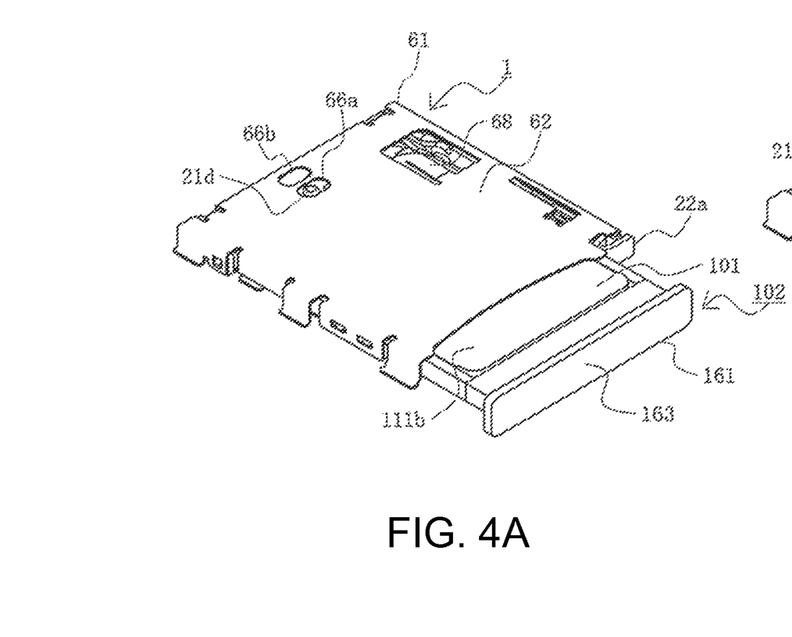

As shown in FIG. 5(b), the force output portion 21a of the ejection lever 21 comes into contact with the front frame portion 165 of the card tray 161. At this time, as shown in FIG. 4(a), the engaging protrusion 21d of the ejection lever 21 engages the first engaging hole 66a of the shell 61. Because the force output portion 21a of the ejection lever 21 comes into contact with the front frame portion 165 of the card tray 161, the orientation shown in FIGS. 5(a)-(b) is maintained. In other words, the initial orientation shown in FIG. 3(b) is maintained. Also, the engaging portion 22b of the push rod 22 engages the force input portion 21 of the ejection lever 21 and remains in the initial position. Therefore, when the card tray 161 is inserted into the card connector 1, the stopper portion 22c of the push rod 22 is always positioned corresponding to the notch portion 85f and, as shown in FIG. 5(b), the holding protruding portion 85c of the first holding member 85 can be pressed by the side surface of the side frame portion 164 of the card tray 161 and displaced outward in the width direction.

Figure 6A:
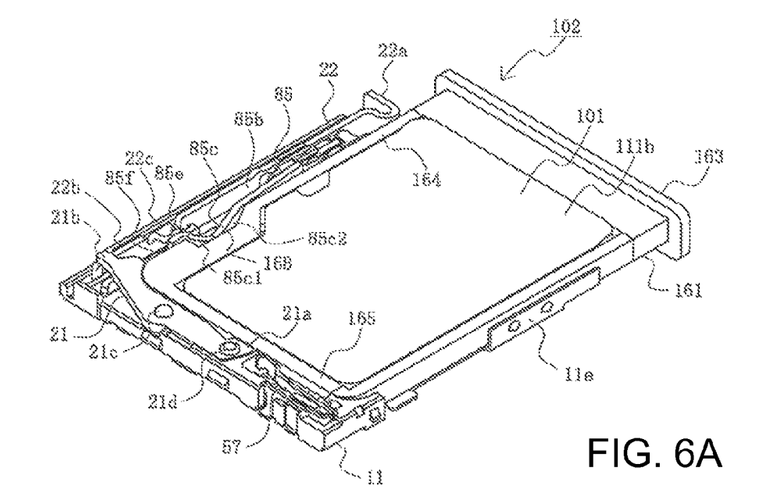

Next, when the user pushes in the card tray 161 even further, the card tray 161 reaches a predetermined position in the card connector 1 as shown in FIG. 6(a). At this time, it presses against the front frame portion 165, the free end of the first contact member 57 is displaced in the direction of the front end portion 11f, and the first contact member 57 comes into contact with the second contact member 58. This turns on the tray detection switch, and it is detected that the card tray 161 has reached a predetermined position in the card connector 1.

When the card tray 161 reaches the predetermined position in the card connector 1, the holding protruding portion 85c of the first holding member 85 is inserted into and engages the holding recessed portion 168 in the corresponding side frame portion 164. In this way, the card connector 161 is locked and held at the predetermined position inside the card connector 1. More specifically, displacement of the card tray 161 in the longitudinal direction is restricted by the first holding member 85, and the card tray 161 is kept from coming out of the card connector 1.

Figure 4B:
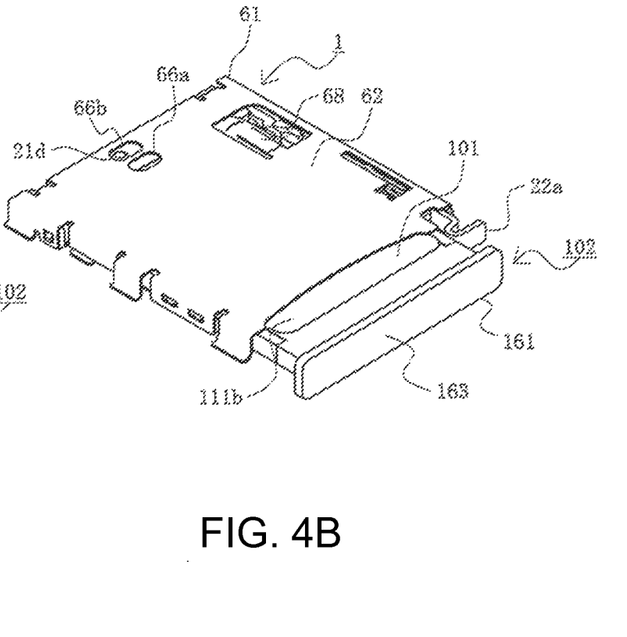

As shown in FIG. 6(a), the force output portion 21a of the ejection lever 21 is pressed against the front frame portion 165 and displaced in the direction of the front end portion 11f until the card tray 161 reaches a predetermined position in the card connector 1. As a result, the force input portion 21b of the ejection lever 21 is displaced in the direction of the rear end portion 11r. In this way, the engaging protrusion 21d of the ejection lever 21 disengages from the first engaging hole 66a in the shell 61 and, as shown in FIG. 4(b), engages the second engaging holes 66b. The resistance sustained when the engaging protrusion 21d is disengaged from the first engaging hole 66a and the impact when the engaging hole 21d engages the second engaging hole 66b are felt by the user as a click. This click lets the user know that the card tray 161 has reached the predetermined position in the card connector 1.

The push rod 22 with the engaging portion 22b engaging the force input portion 21b slides in the direction of the rear end portion 11r and, as shown in FIG. 4(b), the amount by which the operating portion 22a protrudes from the housing 11 is greater than in the initial state shown in FIG. 4(a). The stopper portion 22c of the push rod 22 is displayed in the direction of the rear end portion 11r and reaches the position corresponding to the stopper abutting portion 85e of the first holding member 85. The first holding member 85 is arranged inside the tray ejection rod housing portion 11g near the push rod 22 and further in than the push rod 22 in the width direction, and the stopper portion 22c is formed so as to protrude inward in the width direction. Therefore, as shown in FIG. 6(a), the space between the stopper portion 22c and the stopper abutting portion 85e is very small. Therefore, the stopper abutting portion 85e makes contact with the stopper portion 22c when displaced slightly outward in the width direction, and the holding protruding portion 85c cannot be displaced along with the free end portion 85d outward in the width direction of the housing 11. As a result, the card tray 161 is locked in the predetermined position and is not displaced from the predetermined position in the direction of the rear end portion 11r so as to cause the card tray to come out of the card connector 1. The card tray 161 does not come out of the card connector 1 even if the card connector 1 vibrates or sustains an external shock such as an impact when the electronic device containing the card connector 1 is dropped.

Figure 6B:
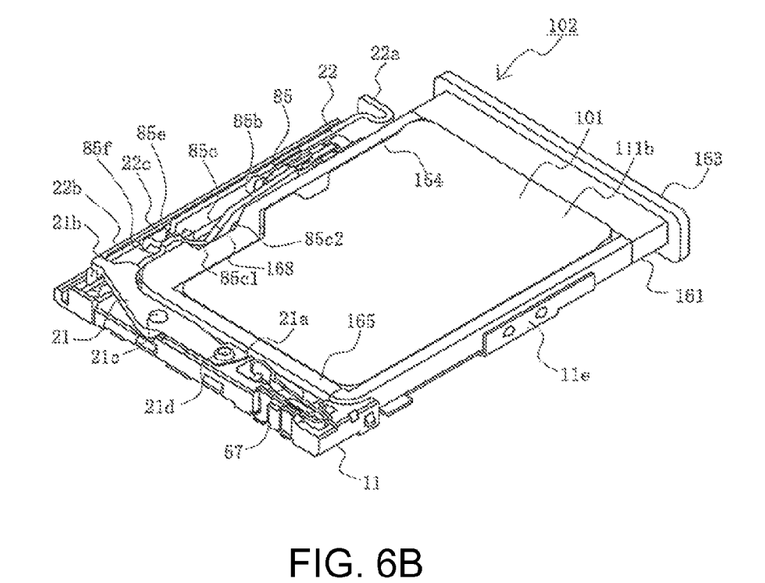

When the user does not use the operating portion 22a of the push rod 22 but rather grasps the rear plate portion 163 of the card tray 161 and yanks the card tray 161 from the card connector 1, that is, improperly removes the tray, the card tray 161 is displaced slightly from the predetermined position towards the rear end portion 11r but then stops as shown in FIG. 6(b). In other words, the card tray 161 cannot be removed from the card connector 1 improperly.

When the card tray 161 is displaced slightly from the predetermined position towards the rear end portion 11r as shown in FIG. 6(b), the forward inclined surface 168a in the holding recessed portion 168 of the side frame portion 164 comes into contact with the forward inclined surface 851c1 of the holding protruding portion 85c in the first holding member 85. The holding protruding portion 85c pushes outward in the width direction of the housing 11, but the stopper portion 22c of the push rod 22 is in a position corresponding to the stopper abutting portion 85e so the stopper abutting portion 85e comes into contact with the stopper portion 22c, and the holding protruding portion 85c cannot be displaced any further in the width direction.

The card 101 housed inside the card tray 161 can exchange data with a computing means in the electronic device containing the card connector 1 when held along with the card tray 161 in a predetermined position. When the card 101 is held in the predetermined position, the contact portion 51c of each terminal 51 of the card connector 51 makes contact with each contact pad 151 on the card 101, and an electrical connection is established.

Sometimes when a card connector 1 is mounted in the electronic device, the user does not intend to use the card connector 1. In other words, the user may insert an empty card tray 161, that is, a card tray 161 not containing a card 101, in order to store the tray. When a card tray 161 not containing a card 101 is inserted, the front frame portion 165 is positioned closer to the top surface 161b than the bottom surface 161a. As a result, the front frame portion 165 does not come into contact with the terminals 51 and damage the terminals 51.

The following is an explanation of the operations performed to eject the card module 102 from the card connector 1.

When the user pushes in the operating portion 22a of the push rod 22 using a finger or a tool such as a pin or rod, the force input portion 21b of the ejection lever 21 engaging the engaging portion 22b of the push rod 22 is displaced in the direction of the front end portion 11f. As a result, the front frame portion 165 is pushed into the force output portion 21a of the ejection lever 21, and the card tray 161 is displaced from the predetermined position in the direction of the rear end portion 11r.

At this time, the stopper portion 22c of the push rod 22 is displaced in the direction of the front end portion 11f from the position corresponding to the stopper abutting portion 85e of the first holding member 85 to the position corresponding to the notched portion 85f. Therefore, when the holding protruding portion 85c of the first holding member 85 comes into contact with the forward inclined surface 168a in the holding recessed portion 168 of the side frame portion 164 at the forward inclined surface 85c1 of the holding recessed portion 85c, it is pushed outward in the width direction of the housing 11 and displaced. Because the holding protruding portion 85c of the first holding member 85 is disengaged from the holding recessed portion 168 of the side frame portion 164 in this way, the card tray 161 is unlocked and can be displaced from the predetermined position towards the rear end portion 11r.

When the user has pushed the push rod 22 to the forward most position, the force output portion 21a of the ejection lever 21 is displaced to the position shown in FIG. 5(b). The engaging protrusion 21d of the ejection lever 21 disengages the second engaging hole 66 in the shell 61 and engages the first engaging hole 66a. The resistance sustained when the engaging protrusion 21d is disengaged from the second engaging hole 66b and the impact when the engaging protrusion 21d engages the first engaging hole 66a are felt by the user as a click. This click lets the user know that the card tray 161 has been unlocked and can be ejected.

At this time, the rear plate portion 163 of the card tray 161 protrudes sufficiently from the insertion slot 18 of the card connector 1. Therefore, the user can grasp the rear plate portion 163 with the fingers and remove the card tray 161 from the card connector 1.

In the Present Disclosure, a card module 102 or card tray 161 holding a card 101 with contact pads 151 on its bottom surface 111a is inserted into the card connector 1. The card connector 1 has a housing 11 with terminals 51 which make contact with the contact pads 151 of the card module 102, a first holding member 85 for holding the card module 102 inserted in the card connector 1, and an ejection mechanism which can change orientation between a first orientation and a second orientation. The ejection mechanism assumes the first orientation before the card module 102 has been inserted into the card connector 1, and assumes the second orientation after the card module 102 has been inserted into the card connector 1. The first holding member 85 can be displaced when the ejection mechanism is in the first orientation, but cannot be displaced when the ejection mechanism is in the second orientation.

Because the first holding member 85 cannot be displaced when the card module 102 has been inserted into the card connector 1 and the card module 102 is housed inside the card connector 1, the force holding the card module 102 increases. Therefore, the card module 102 is secured inside the card connector 1 and overall reliability is improved.

The first holding member 85 includes a holding protruding portion 85c which protrudes inward in the width direction of the housing 11, the card module 102 includes a holding recessed portion 168 formed on the outside surface, and the holding protruding portion 85c of the first holding member 85 engages the holding recessed portion 168 to hold the card module 102. Therefore, the card module 102 is locked and secured inside the card connector 1.

The ejection mechanism includes a push rod 22 able to slide in the insertion and ejection directions of the card module 102, and an ejection lever 21 pivotably connected to the push rod 22. The ejection lever 21 has a force output portion 21a abutting the card module 102, a fulcrum portion 21c, and a force input portion 21b on the other side as the force output portion 21a with the fulcrum portion 21c interposed between them. The push rod 22 includes an engaging portion 22b engaging the force input portion 21b, an operating portion 22a protruding from the housing 11, and a stopper portion 22a able to interfere with the first holding member 85. Therefore, the user can activate the ejection mechanism and easily eject the card module 102 from the card connector 1 by pushing in the operating portion 22a of the push rod 22. When the card module 102 is housed inside the card connector 1, the ejection mechanism is in the second orientation, the stopper portion 22c of the push rod 22 interferes with the first holding member 85, and the force holding the card module 102 increases. As a result, the card module 102 cannot be pulled out of the card connector 1 improperly.

Also, the first holding member 85 has a notched portion 85f unable to make contact with the stopper portion 22c, and a stopper abutting portion 85e formed near the notched portion 85f which is also unable to make contact with the stopper portion 22c. When the ejection mechanism is in the first orientation, the stopper portion 22c is in a position corresponding to the notched portion 85f with respect to the insertion and ejection directions of the card module 102. When the ejection mechanism is in the second orientation, the stopper portion 22c is in a position corresponding to the stopper abutting portion 85e with respect to the insertion and ejection directions of the card module 102. Therefore, when the card module 102 has been inserted into the card connector 1 and the operating portion 22a of the push rod 22 has been pushed in by the user to eject the card module 102 from the card connector 1, the stopper portion 22c is in the position corresponding to the notched portion 85f, the first holding member 85 can be displaced, and the card module 102 can be easily inserted and ejected. When the card module 102 is housed in the card connector 1 and the user has not pushed in the operating portion 22a of the push rod 22, the stopper portion 22c is in the position corresponding to the stopper abutting portion 85e, and the first holding member 85 cannot be displaced. As a result, the card module 102 cannot be removed from the card connector 1 improperly.

The ejection lever 21 also includes an engaging protrusion 21d for engaging the ejection lever 21 when the ejection mechanism is in the first orientation and the second orientation. Therefore, external forces such as vibrations and impacts on the card connector 1 do not change the orientation of the ejection mechanism. When the card module 102 is inserted into the card connector 1 and the ejection mechanism is in the second orientation, the first holding member 85 cannot be displaced. Also, as shown in FIG. 6(b), when the card module 102 is displaced slightly in the direction of the rear end portion 11r, the ejection mechanism is in the first orientation, and the first holding member 85 cannot be displaced.

Also, a shell 61 is mounted on the housing 11 to cover at least the housing 11 and a portion of the card module 102 inserted into the card connector 1, and the shell 61 includes an engaging hole 66 for engaging the engaging protrusion 21d. This simple configuration is able to reliably secure the ejection lever 21. The user operating the ejection lever 21 can also feel a click.

The following is an explanation of a second embodiment of the Present Disclosure. The components that are identical to those of the first embodiment are denoted by the same reference numbers and further explanation has been omitted. Also, further explanation of all operations and effects that are identical to those of the first embodiment has been omitted.

Figure 7:
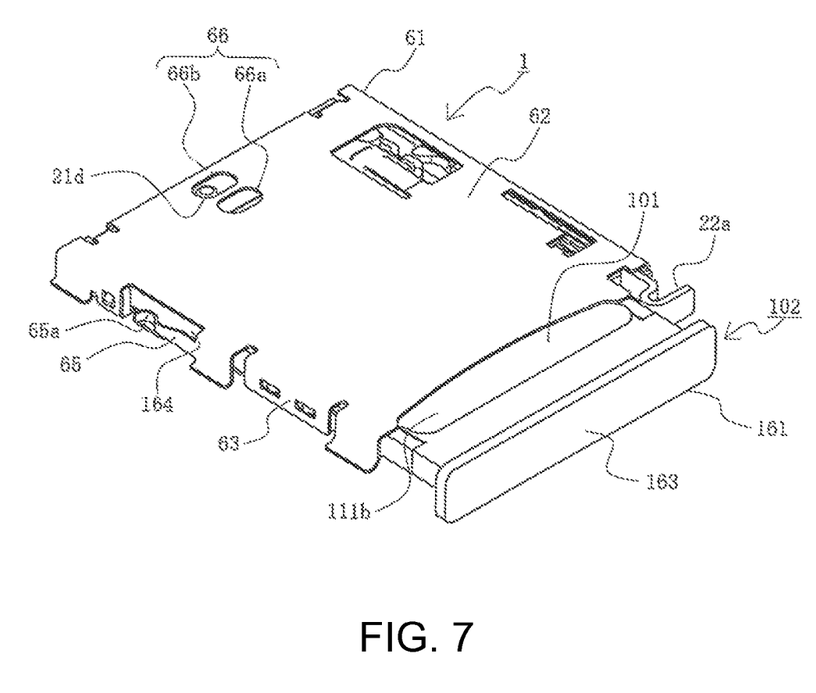
FIG. 7 is a perspective view showing a card module inserted into the card connector in the second embodiment of the Present Disclosure.

Referring to FIG. 7, the shell 61 in the present embodiment includes a second holding member 65 serving as a second holding spring portion for holding the card module 102 inserted in the card connector 1. The second holding member 65 is a plate-like member with spring action formed by bending a portion of the side plate portion 63 inward in the width direction of the shell 61. The tip or free end is cantilevered and is elastically deformable in the width direction of the shell 61, that is, in the width direction of the housing 11. The side plate portion 63 is the side plate portion 63 on the opposite end to the tray ejection rod housing portion 11g housing the first holding member 85.

The second holding member 65 is oriented so that the base end is connected to the side plate portion 63, the free end faces the front end portion 61f, and the free end is positioned further inward than the base end in the width direction of the housing 11. The holding protruding portion 65a is formed near the free end so as to protrude inward in the width direction of the housing 11.

The holding protruding portion 65a is preferably in substantially the same position as the holding protruding portion 85c of the first holding member 85 relative to the longitudinal direction. Also, the card tray 161 preferably has a holding recessed portion 168 formed on both the left and right side frame portions 164.

In the present embodiment, the shell 61 includes a second holding member 65 formed on the opposite end with respect to the first holding member 85. Because the card module 102 inserted inside the card connector 1 is held on both sides, its orientation is stable. The force holding the card module 102 is also increased.

The other configurational elements of the card connector 1 are identical to those of the first embodiment so further explanation has been omitted. Because the operations are identical to those of the first embodiment, further explanation of these has also been omitted.

While a preferred embodiment of the Present Disclosure is shown and described, it is envisioned that those skilled in the art may devise various modifications without departing from the spirit and scope of the foregoing Description and the appended Claims.

What is claimed is:

1. A card connector configured to have a card module inserted therein, the card module including electrode pads provided on one surface and first and second side frame portions, the card connector comprising:
   a housing, the housing including connection terminals arranged to contact the electrode pads of the card module after the card module is inserted into the card connector;
   a first holding spring portion, the first holding spring portion configured to engage the first side frame portion of the card module after the card module is inserted into the card connector;
   an ejection mechanism, the ejection mechanism being inside the housing and able to change orientation between a first orientation and a second orientation, the first orientation occurring before the card module is inserted into the card connector, the second orientation occurring after the card module has been completely inserted into the card connector; and
   a cover member, the cover member being mounted on the housing and covering at least the housing and a portion of the card module after the card module is inserted into the card connector, the cover member includes a second holding spring portion, the second holding spring portion configured to engage the second side frame portion of the card module after the card module is inserted into the card connector;
   wherein the first holding spring portion is displaceable when the ejection mechanism is in the first orientation, and non-displaceable when the ejection mechanism is in the second orientation.

2. A card connector, configured to have a card module inserted therein, the card module including electrode pads provided on one surface, the card connector comprising:
   a housing, the housing including connection terminals arranged to contact the electrode pads of the card module after the card module is inserted into the card connector;
   a holding spring portion, the holding spring portion configured to hold the card module to be inserted into the card connector; and
   an ejection mechanism, the ejection mechanism being inside the housing and able to change orientation between a first orientation and a second orientation, the first orientation occurring before the card module is inserted into the card connector, the second orientation occurring after the card module has been completely inserted into the card connector, the ejection mechanism includes a rod member, the rod member being able to slide in the insertion and discharge directions of the card module, the rod member further includes a stopper portion, the stopper portion interfering with the holding spring portion;

wherein the holding spring portion is displaceable when the ejection mechanism is in the first orientation, and non-displaceable when the ejection mechanism is in the second orientation.

3. The card connector of claim 2, wherein the holding spring portion includes a holding protruding portion, the holding protruding portion bulging inward in the width direction of the housing, the holding spring portion configured to hold the inserted card module when the holding protruding portion engages with a holding recessed portion formed in an outer side surface of the card module.

4. The card connector of claim 2, wherein the ejection mechanism further includes a pivotable lever member linked to the rod member.

5. The card connector of claim 4, wherein the lever member includes a force output portion configured to abut the card module after the card module is inserted into the card connector.

6. The card connector of claim 5, wherein the lever member further includes a fulcrum portion.

7. The card connector of claim 6, wherein the lever member further includes a force input portion, the force input portion being positioned opposite the force output portion, the fulcrum is interposed between the force output portion and the force input portion.

8. The card connector of claim 7, wherein the rod member includes an engaging portion, the engaging portion engaging the force input portion.

9. The card connector of claim 8, wherein the rod member further includes an operating portion, the operating portion protruding from the housing.

10. The card connector of claim 2, wherein the holding spring portion further includes a notched portion, the notched portion being unable to abut the stopper portion.

11. The card connector of claim 10, wherein the holding spring portion further includes a stopper abutting portion, the stopper abutting portion being formed adjacent the notch portion and able to abut the stopper portion.

12. The card connector of claim 11, wherein the stopper portion is positioned corresponding to the notched portion in relation to the insertion and discharge directions of the card module when the ejection mechanism is in the first orientation.

13. The card connector of claim 12, wherein the stopper portion is positioned corresponding to the stopper abutting portion in relation to the insertion and discharge directions of the card module when the ejection mechanism is in the second orientation.

14. The card connector of claim 1, wherein the rod member further includes an engaging portion, the engaging portion engaging the lever member when the ejection mechanism is in the first orientation and in the second orientation.

15. The card connector of claim 14, further comprising a cover member, the cover member being mounted on the housing and covering at least the housing and a portion of the card module after the card module is inserted into the card connector, the cover member including an opposing engaging portion for engaging the engaging portion.

16. The card connector of claim 2, further comprising a cover member, the cover member being mounted on the housing and covering at least the housing and a portion of the card module after the card module is inserted into the card connector, the cover member including a second holding spring portion, the second holding spring portion being formed opposite the holding spring portion.

17. A card connector configured to have a card module inserted therein, the card module including electrode pads provided on one surface, the card connector comprising:
a housing, the housing including connection terminals arranged to contact the electrode pads of the card module after the card module is inserted into the card connector;
a holding spring portion, the holding spring portion configured to hold the card module to be inserted into the card connector;
an ejection mechanism, the ejection mechanism being inside the housing and able to change orientation between a first orientation and a second orientation, the first orientation occurring before the card module is inserted into the card connector, the second orientation occurring after the card module has been completely inserted into the card connector, wherein the holding spring portion is displaceable when the ejection mechanism is in the first orientation, and non-displaceable when the ejection mechanism is in the second orientation, the ejection mechanism comprises a rod member and a lever member, the rod member being able to slide in insertion and discharge directions of the card module, the lever member being pivotable about a fulcrum, the lever member having a force input portion and a force output portion, the fulcrum being interposed between the force input portion and the force output portion, the rod member engaging the force input portion, the force output portion abutting the card module, the rod member further includes a stopper portion, the stopper portion interfering with the holding spring portion; and
a detection switch, the detection switch comprising first and second contact members, wherein the first and second contact members do not make contact with one another before the card module is inserted into the card connector, and wherein the first and second contact members do make contact with one another after the card module has been completely inserted into the card connector.

18. An assembly comprising:
a card module including electrode pads on one surface and first and second side frame portions; and
a card connector configured to have the card module inserted therein; the card connector comprising:
a housing, the housing included connection terminals arranged to contact the electrode pads of the card module when the card module is inserted into the card connector;
an ejection mechanism, the ejection mechanism being inside the housing and able to change orientation between a first orientation and a second orientation, the first orientation occurring when the card module is inserted into the card connector, the second orientation occurring when the card module is not inserted into the card connector;
a first holding spring portion, the first holding spring portion engaging the first side frame portion of the card module when the card module is inserted into the card connector, the first holding spring portion being displaceable when the ejection mechanism is in the first orientation, the first holding spring portion being non-displaceable when the ejection mechanism is in the second orientation; and a
cover member, the cover member being mounted on the housing and covering at least the housing and a portion of the card module when the card module is inserted into the card connector, the cover member includes a second holding spring portion, the second holding spring portion engaging the second side frame portion of the card module when the card module is inserted into the card connector.

19. An assembly comprising:
a card module including electrode pads on one surface; and
a card connector configured to have the card module inserted therein, the card connector comprising:
a housing, the housing including connection terminals arranged to contact the electrode pads of the card module when the card module is inserted into the card connector;
a holding spring portion, the holding spring portion holding the card module when the and module is inserted into the card connector;
an ejection mechanism, the ejection mechanism being inside the housing and able to change orientation between a first orientation and a second orientation, the first orientation occurring when the card module is not inserted into the card connector, the second orientation occurring when the card module is inserted into the card connector, the ejection mechanism includes a rod member, the rod member being able to slide in the insertion and discharge directions of the card module, the rod member further includes a stopper portion, the stopper portion interfering with the holding spring portion;
wherein the holding spring portion is displaceable when the ejection mechanism is in the first orientation, and wherein the holding spring portion is non-displaceable when the ejection mechanism is in the second orientation.

* * * * *